United States Patent Office 3,111,361
Patented Nov. 19, 1963

3,111,361
SYNTHETIC FIBERS AND FABRICS THEREOF, POLYMERS THEREFOR, AND METHODS OF PRODUCING THEM
Fabian T. Fang, Levittown, Pa., assignor to Rohm & Haas Company, Philadelphia, Pa., a corporation of Delaware
No Drawing. Filed May 11, 1960, Ser. No. 28,210
15 Claims. (Cl. 8—115.5)

This invention relates to polymers of monovinyl aromatic compounds, such as styrene, formed articles thereof, such as fibers and films, and to methods of stabilizing the polymers and articles against excessive shrinkage on heating or on contact with solvents. The present invention is particularly concerned with the production of artificial fibers and filaments from polymerized monovinyl aromatic compounds such as styrene. The invention is more particularly concerned with the production of strong and tough fibers and fabrics of this class as will be pointed out more particularly hereinafter.

Fibers have been produced from polymerized styrene for various uses. However, when such fibers are stretched in order to increase the strength thereof, they are subject to shrinkage and loss of strength on heating. This characteristic limits the usefulness of the fibers since the simple operation of pressing fabrics made therefrom with a hot iron requires extreme caution to avoid excessive heat which would cause serious shrinkage and loss of shape of the textile fabric. In household and industrial uses, this tendency to shrink on heating is a serious limitation of the fibers. The use of the fibers as bristles in brushes is quite common but here there is risk of serious damage if the user should apply the brushes to hot articles during use. The use of fabrics made from such fibers and filaments for filtration of liquids or gases is also limited in scope because of the tendency to shrink on heating. It is desirable to extend the use of such filtering media to embrace the filtration of hot liquids and gases.

Heretofore, it has been known to treat polystyrene with aluminum chloride in ethylene chloride with the formation of a degraded polymer. When the polymer so treated is an insoluble cross-linked copolymer including a small amount of a polyethylenically unsaturated compound, such as divinyl benzene, the treatment renders the copolymer soluble in character.

In accordance with the present invention, the surprising discovery has been made that treatment of a linear polymer of a monovinyl aromatic compound, such as styrene, that is a thermoplastic, soluble, or uncross-linked type thereof, with a Lewis acid catalyst, such as aluminum chloride, can result in rendering the polymer resistant to heat and solvents provided the treatment is effected in a solvent which does not dissolve the polymer but is a complexing solvent for the Lewis acid compound, i.e. a solvent having a polar group which shares electrons with the cation of the Lewis acid. Examples of the complexing solvents include dioxane, carbon disulfide, nitrobenzene, and the nitroparaffins having from 1 to 8 carbon atoms. The lower nitroparaffins having from 1 to 4 carbon atoms are especially advantageous because of their serving as the reaction medium and at the same time minimizing or practically eliminating loss of strength when stretched films or fibers are treated. Thus, nitromethane, nitroethane, 2-nitropropane, 1-nitropropane, and any of the nitrobutanes are useful, the first two mentioned providing optimum results generally.

The monovinyl aromatic compound which may also be termed a mono-alkenyl aromatic compound may be any of those having the formula

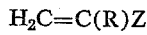

H₂C=C(R)Z wherein R is hydrogen or an alkyl group advantageously of less than 3 carbon atoms and Z is an aryl group which has positions on an aromatic nucleus available for substitution. The formula includes vinyl aryls, such as styrene, vinyl naphthalene, vinyl diphenyl, vinyl fluorene, etc., and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example methyl-styrene, e.g., o-, m-, and p-methyl-styrenes, dimethyl-styrenes, o-, m-, and p-ethyl-styrenes, isopropyl-styrenes, tolyl-styrenes, benzyl-styrenes, cyclohexyl-styrenes, methoxy-styrenes, phenoxy-styrenes, o-, m-, and p-chloro-styrenes, o-, m-, and p-fluorostyrenes, chloro-methyl-styrenes, fluoromethyl-styrenes, trifluoromethyl-styrenes, vinyl-methyl-naphthalenes, vinyl - ethyl - naphthalenes, vinyl - chloro-naphthalenes, vinyl-methyl-chloro-naphthalenes, etc. The polymerizable monomers which can be used advantageously with ionic type catalysts include aromatic compounds having a vinyl group containing an alkyl group in its alpha position, e.g., isopropenyl or alpha-methyl-vinyl, alpha-ethyl-vinyl, alpha-propyl-vinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds.

The treatment may be effected on beads of the styrene polymer produced by suspension polymerization. It is especially advantageous to apply the treatment to films or fibers in which the polymer molecules have been oriented in one or more directions and particularly in the case of fibers longitudinally of the axis of the fiber. The orientation may be the result of stretching, rolling, or otherwise working the film or fiber. The extent of stretching may be from about 3% to several thousand percent (e.g., 2000%) of the original length of the film or fiber as obtained by known spinning processes.

The stabilization treatment may be applied to loose fibers, to filamentary bundles such as tows, yarns, plied structures such as threads, felt-like masses which may be termed non-woven fabrics, as well as fabrics of woven, knitted, netted, knotted, braided, or otherwise formed textile or industrial fabrics. The treating liquid may be applied by spraying thereof upon the fabric, or by suitably immersing the fabric or filamentary structure in the liquid. Slashers or textile pads may be employed. Tenter frames or other devices may be employed to hold films, sheets, pellicles, or fabrics under tension or in a manner to control the extent of shrinkage during the treatment. The yarns, filaments, tows, and the like can be wound with controlled tension in the form of bobbins with the windings distributed to favor uniform treatment and treated on the bobbin.

The Lewis acids or Friedel-Crafts catalysts which are used include aluminum chloride, ferric chloride, stannic chloride, titanium chloride, the corresponding bromides such as aluminum bromide and so forth, and boron trifluoride, especially its complexes such as with ethyl ether.

The tendency of the fibers to shrink in the solvent can be substantially completely prevented by employing the Lewis acid catalyst at a very high concentration therein or if desired, by holding the fibers under tension during treatment. The necessity to hold the fibers under tension is practically eliminated when concentrations of the catalyst in the neighborhood of 1 mole per liter or higher are used.

The intensity and duration of treatment is preselected to render the fibers or fabrics resistant to shrinkage at any predetermined temperature from about 90° C. (a common scouring temperature) to 200° C. or even higher. Such treatment also renders the fibers and fabrics resistant to dry-cleaning solvents.

The temperature of treatment may range from about 0° C. to about 100° C. In general, the time of treatment varies inversely with the temperature and it may range from about one minute up to two hours at the higher temperature of the range above and for about 1 to 72 hours at the lower temperature depending on the extent of cross-linking desired. The treatment can be allowed to proceed for longer times than specified, but ordinarily such additional treatment provides no additional benefit.

It is believed that the cross-linking action which serves for stabilization is the result of an alkylation of a styrene nucleus of one polymer chain by the backbone of another polymer chain. However, it is not intended that the invention should be limited to any particular theory of operation.

The stabilized fibers or fabrics are far more versatile in utility than the uncross-linked polystyrene or related fibers. They are adapted to be used in textiles, such as for automobile seat covers, dresses, curtains, draperies, and are adapted to be subjected to heat as during ironing and laundering without undergoing shrinkage. The products not only resist shrinkage under heat, but they are in general stronger and tougher than the fibers from which they are made. The fibers can be employed in the making of all sorts of industrial fabrics, felted, woven, or otherwise formed, and are particularly adapted to heavy duty filtration of all sorts of gases and liquors even at elevated temperatures. The fabrics are also adapted to be converted as by sulfonation into ion-exchange fabrics adapted to be employed for a wide variety of uses, the pile or tufted type of fabric being particularly useful in this connection.

The polymers, fibers, fabrics, or other articles which have been stabilized or cross-linked by the treatment described hereinabove may be sulfonated by treatment with concentrated sulfuric acid, oleum, sulfur trioxide, or chlorosulfonic acid. The sulfonation may be carried out at room temperature or up to 100° C. or even as low as 0° C. This time depends upon the temperature and the particular sulfonating agent. Chlorosulfonic acid is extremely rapid in its action even at 0° C. When sulfur trioxide is employed as a sulfonating agent, a solvent such as dioxane may be employed.

The treatment with sulfuric acid or fuming sulfuric acid may be accelerated by the employment of catalysts such as silver sulfate.

When the desired extent of sulfonation has been effected, the fibrous product is removed from the sulfonating bath and washed or rinsed. This may desirably be effected by treatment with two or more increasingly dilute sulfuric acid or other sulfonating acid solutions in water. Then, the treated fabric may be finally washed and if desired, neutralized in an aqueous alkaline solution.

By this procedure of the present invention, ion-exchange fabrics may be obtained which are highly sulfonated and yet are not subject to excessive swelling or shrinkage in aqueous media during use as ion-exchangers. The extent of sulfonation may be anywhere from 0.1 to 3 sulfonic acid groups per aromatic nucleus. The ion-exchange capacity may range from about 0.5 milliequivalent per gram to 5 milliequivalents per gram. Preferred products have ion-exchange capacity from 3 to 5 milliequivalents per gram.

The sulfonated products of the present invention are quite advantageous and have a wide variety of uses. In textile products, the presence of 5 to 50 sulfonic acid groups per 100 aromatic nuclei in the polymerized monovinyl aromatic compound in the fiber imparts advantageous moisture-regain properties and reduces the tendency to develop static charges on rubbing. This latter property is extremely important in the production of automobile seat covers. Fabrics comprising fibers having 50 to 300 or more sulfonic acid groups per 100 aromatic nuclei in the polymerized monovinyl aromatic compound of the fiber are advantageous in numerous uses. They are useful as wash cloths (for both face- and dish-washing purposes) in which utility they soften the water that is employed. They may, of course, be readily regenerated by soaking in an acid medium. The pile and tufted fabrics are particularly useful when they contain sulfonic acid groups in the larger range specified for use as ion-exchange media. The pile or height of tuft in such fabrics may vary extensively. Generally, a thickness of 0.05 to 1 inch or more is quite advantageous.

In the examples which are illustrative of the invention, the parts and percentages are by weight unless otherwise indicated.

Example 1

(a) A continuous filament yarn (1300 denier, 500 filament) of a polystyrene having a viscosity-average molecular weight of $5 \times 10^6$ which has been stretched about 400% during manufacture is wound on a perforated cylindrical glass holder under tension and then immersed in a 1.0 molar solution of aluminum chloride in nitromethane at 30° C. for 24 hours. The treated fiber is rinsed thoroughly with water and air-dried. The resulting yarn is insoluble in toluene to the extent of 93% after the treatment and has an equilibrium swelling ratio of less than 2.6 by weight. The base fiber, on the other hand, is completely and readily soluble in toluene and other common organic solvents. The treated yarn is also resistant to shrinkage at temperatures up to 200° C.

(b) The cross-linked yarn obtained in part (a) is further treated in a relaxed state in commercial concentrated sulfuric acid (96% by weight) at 50° C. for 5½ hours. The treated fiber is rinsed first in dilute sulfuric acid, and then thoroughly with water. The resulting yarn constitutes a strongly acidic cation-exchange fiber with an exchange capacity of 4.13 meq./g. in the form of sulfonic acid functional groups, the number of the latter averaging about 1 per aromatic nucleus.

Example 2

A fabric is woven from a continuous filament yarn (1300 denier, 500 filament) of a polystyrene having a viscosity-average molecular weight of $5 \times 10^6$ which has been stretched about 400% during manufacture is wound on a perforated cylindrical glass holder under tension and then immersed in a 1.0 molar solution of boron trifluoride ether complex in nitroethane at 45° C. The fabric is thus rendered resistant to toluene.

Example 3

Similar results are obtained when a yarn formed of fibers of a polymer of p-vinyltoluene is soaked for 24 hours in a 1-molar stannic chloride solution in nitromethane at 40° C.

Example 4

Example 1 is repeated replacing the aluminum chloride with a titanium chloride solution in nitropropane at 50° C.

Example 5

(a) Example 1 is repeated replacing the aluminum chloride with a ferric chloride solution in nitropropane at 60° C.

(b) Similar results are obtained when a yarn formed of fibers of a polymer of p-vinylnaphthalene is soaked for 24 hours in a 1-molar stannic chloride solution in nitromethane at 40° C.

I claim:

1. A process which comprises treating a formed body of a linear polymer of a monovinyl aromatic compound with a Lewis acid in a nitroalkane having 1 to 4 carbon atoms at a temperature of about 0° C. to 100° C. until the polymer is cross-linked to a condition in which it is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

2. A process which comprises treating a fiber of a linear polymer of a monovinyl aromatic compound with a Lewis acid in a nitroalkane having 1 to 4 carbon atoms at a temperature of about 0° to 100° C. until the polymer is cross-linked to a condition in which the fiber is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

3. A process which comprises treating a woven fabric comprising fibers of a linear polymer of a monovinyl aromatic compound with a Lewis acid in a nitroalkane having 1 to 4 carbon atoms at a temperature of about 0° C. to 100° C. until the polymer is cross-linked to a condition in which the fabric is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

4. A process which comprises treating a formed body of a linear polymer of a monovinyl aromatic compound with a Lewis acid in a nitroalkane having 1 to 4 carbon atoms at a temperature of about 0° C. to 100° C. until the polymer is cross-linked to a condition in which it is resistant to heat and solvents and then sulfonating the polymer, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

5. A process which comprises treating a formed body of a linear polymer of styrene with a Lewis acid in a nitroalkane having 1 to 4 carbon atoms at a temperature of 0° C. to 100° C. until the polymer is cross-linked to a condition in which it is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

6. A process which comprises treating a fiber of a linear polymer of styrene with a Lewis acid in a nitroalkane having 1 to 4 carbon atoms at a temperature of about 0° C. to 100° C. until the polymer is cross-linked to a condition in which the fiber is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

7. A process which comprises treating a woven fabric comprising fibers of a linear polymer of styrene with a Lewis acid in a nitroalkane having 1 to 4 carbon atoms at a temperature of about 0° C. to 100° C. until the polymer is cross-linked to a condition in which the fabric is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

8. A process which comprises treating a film formed of a linear polymer of a monovinyl aromatic compound, the polymer molecules being oriented in at least one direction, with a Lewis acid in a nitroalkane having 1 to 4 carbon atoms at a temperature of about 0° C. to 100° C. until the polymer is cross-linked to a condition in which it is resistant to heat and solvents, the Lewis acid being selected from the group consisting of borontrifluo-ride, the complexes of borontrifluoride with ethyl ether, aluminum chloride, aluminum bromide, ferric chloride, ferric bromide, stannic chloride, stannic bromide, titanium chloride, and titanium bromide.

9. A process which comprises treating a fiber formed of a linear polymer of a monovinyl aromatic compound, the polymer molecules being oriented longitudinally of the axis of the fiber, with a Lewis acid in a nitroalkane having 1 to 4 carbon atoms at a temperature of about 0° C. to 100° C. until the polymer is cross-linked to a condition in which it is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

10. A process which comprises treating a formed body of a linear polymer of a monovinyl aromatic compound selected from the group consisting of those having a single aryl ring and those having fused aryl rings with a Lewis acid in a nitroalkane having 1 to 4 carbon atoms at a temperature of about 0° C. to 100° C. until the polymer is cross-linked to a condition in which it is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

11. As an article of manufacture, a film formed of a linear polymer of a monovinyl aromatic compound, the linear polymer molecules having been oriented in at least one direction and then self-cross-linked in oriented condition by treatment with a Lewis acid catalyst to a condition in which the fiber is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

12. As an article of manufacture, a fiber formed of a linear polymer of a monovinyl aromatic compound, the linear polymer molecules having been oriented longitudinally of the axis of the fiber and then self-cross-linked in oriented condition by treatment with a Lewis acid catalyst to a condition in which the fiber is resistant to heat and solvents, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

13. As an article of manufacture, a filmy product formed of a linear polymer of a monovinyl aromatic compound, the linear polymer molecules having been oriented in at least one direction and then self-cross-linked by treatment with a Lewis acid catalyst to a condition in which the polymer is resistant to heat and solvents, the polymer containing 0.1 to 3 sulfonic acid groups per aromatic nucleus, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

14. As an article of manufacture, a fiber formed of a linear polymer of a monovinyl aromatic compound, the linear polymer molecules having been oriented longitudinally of the axis of the fiber and then self-cross-linked by treatment with a Lewis acid catalyst to a condition in which the polymer is resistant to heat and solvents, the polymer containing 0.1 to 3 sulfonic acid groups per aromatic nucleus, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

15. As an article of manufacture, a fiber formed of a linear polymer of a monovinyl aromatic compound selected from the group consisting of those having a single aryl ring and those having fused aryl rings, the linear polymer molecules having been oriented longitudinally of the axis of the fiber and then self-cross-linked by treatment with a Lewis acid catalyst to a condition in which the polymer is resistant to heat and solvents, the polymer containing 0.1 to 3 sulfonic acid groups per aromatic nucleus, the Lewis acid being selected from the group consisting of borontrifluoride, the complexes of borontrifluoride with ethyl ether, aluminum chloride, aluminum bromide, ferric chloride, ferric bromide, stannic chloride, stannic bromide, titanium chloride, and titanium bromide.

References Cited in the file of this patent

UNITED STATES PATENTS

| | | |
|---|---|---|
| 2,403,464 | Smith | July 9, 1946 |
| 2,427,126 | Dreyfus | Sept. 9, 1947 |
| 2,540,726 | Graham et al. | Feb. 6, 1951 |
| 2,764,561 | McMaster et al. | Sept. 25, 1956 |
| 2,867,611 | Teot | Jan. 6, 1959 |
| 2,979,774 | Rusignolo | Apr. 18, 1961 |
| 2,988,783 | Miller et al. | June 20, 1961 |
| 3,021,269 | Miller | Feb. 13, 1962 |